United States Patent [19]

Tsurusaki

[11] Patent Number: 5,033,081
[45] Date of Patent: Jul. 16, 1991

[54] KEY TELEPHONE SYSTEM

[75] Inventor: Masayuki Tsurusaki, Hino, Japan

[73] Assignee: Kabushiki Kaisha Toshiba, Kawasaki, Japan

[21] Appl. No.: 580,543

[22] Filed: Sep. 11, 1990

[30] Foreign Application Priority Data

Sep. 12, 1989 [JP] Japan .................................. 1-236302

[51] Int. Cl.$^5$ ......................... H04M 1/58; H04M 9/08
[52] U.S. Cl. .................................... 379/390; 379/157; 379/392
[58] Field of Search ............... 379/156, 157, 165, 390, 379/391, 392

[56] References Cited

U.S. PATENT DOCUMENTS 4,965,822 10/1990 Williams ............................. 379/390
4,982,427 1/1991 Niolai ............................. 379/390 X Primary Examiner—Stafford D. Schreyer
Attorney, Agent, or Firm—Foley & Lardner

[57] ABSTRACT

A key telephone system comprising a terminal device and a main apparatus which exchanges speech signals with the terminal device, the terminal device having a loudspeaking circuit for providing a predetermined amount of loss to either one of first speech signals selected to be transmitted to the main apparatus and second speech signals received from the main apparatus to prevent howling in a loudspeaking conversation mode, said system comprising: a first communication unit provided in the terminal device, for sending the first speech signals to the main apparatus through a first channel and receiving the second speech signals from the main apparatus through a second channel separated from the first channel; second communication unit provided in the main apparatus and connected to the first communication unit, for receiving the first speech signals from the first communication unit through the first channel and sending the second speech signals to the first communication unit through the second channel; in the first and second communication unit side tones between the first and second speech signals not being generated, whereby the predetermined amount of the loss caused by the loudspeaking circuit can be set to less than a loss which may be required for howling prevention if the side tones are generated.

4 Claims, 3 Drawing Sheets

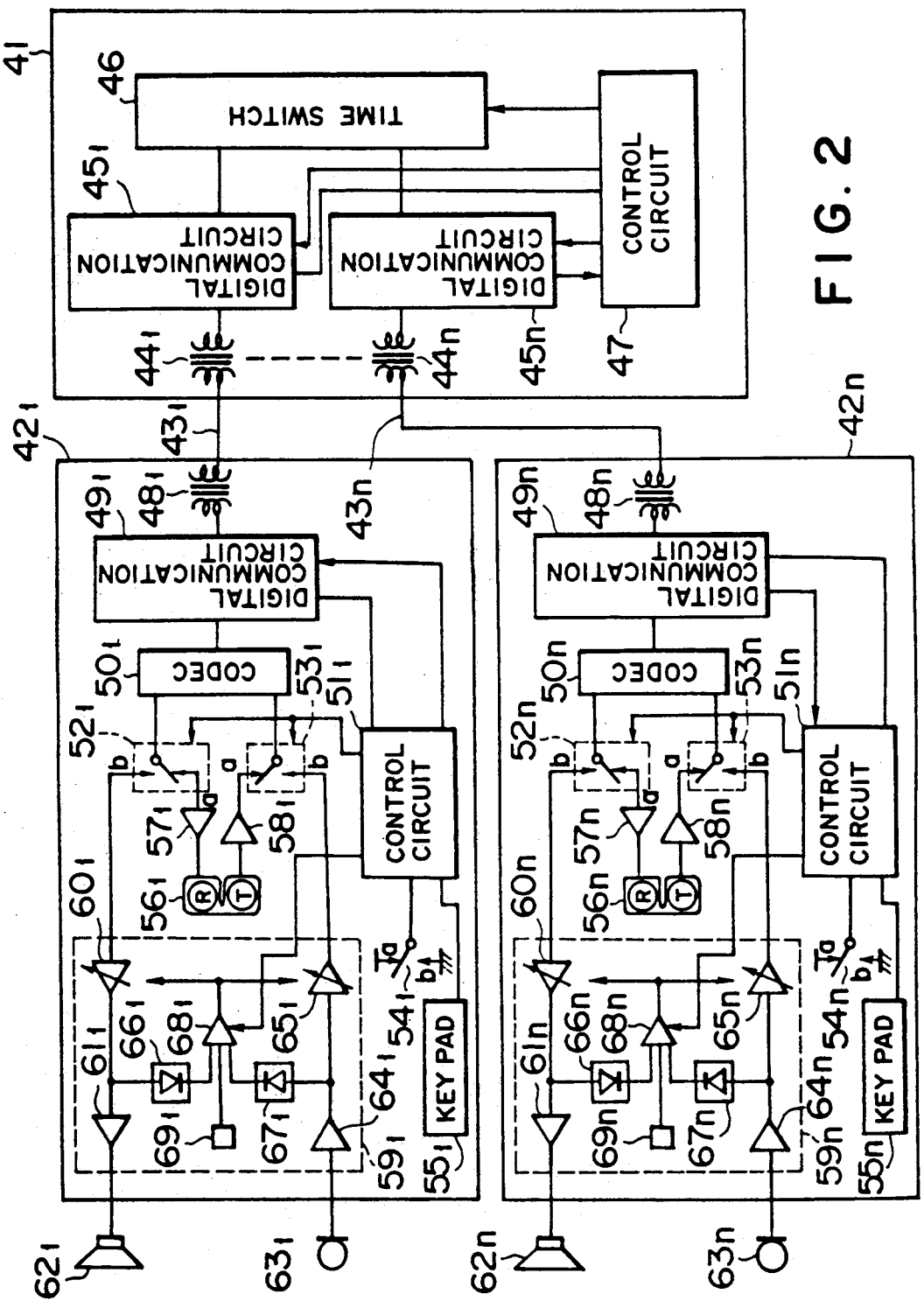
F I G. 2

KEY TELEPHONE SYSTEM

BACKGROUND OF THE INVENTION

This invention relates to improvement of the loudspeaking function of key telephone system.

FIG. 1 shows configuration of a key telephone according to the prior art. A block designated reference number 1 is a main apparatus which is connected to a plurality of key telephones $2_1$-$2_n$ through two-wire speech signal lines $3_1$-$3_n$ and through two-wire control signal lines $4_1$-$4_n$. In the main apparatus, the speech signal lines $3_1$-$3_n$ are connected through speech signal transformers $5_1$-$5_n$, two/four wire conversion circuits $6_1$-$6_n$ and CODECs $7_1$-$7_n$ to a time switch 8. Also, the control signal lines $4_1$-$4_n$ are connected through control signal transformers $9_1$-$9_n$ and two/four wire conversion circuits $10_1$-$10_n$ to a control circuit 11. The time switch 8 performs speech pat switching under control of the control circuit 11.

In the key telephone 2, the speech signal line 3 is connected through a speech signal transformer 12 and a two/four wire conversion circuit 13 to mode selector switches 14 and 15. The mode selector switches 14 and 15 select a handset conversation mode or a loudspeaking conversation mode. When contacts a of the switches are on, the handset conversation mode is selected. In the handset conversation mode, a handset 16 is connected to the two/four wire conversion circuit 13 through a received speech signal amplifier 17 and a transmitted speech signal amplifier 18. On the other hand, in the loudspeaking conversation mode in which contacts b are on, a loudspeaking circuit 19 is connected to the two/four wire conversion circuit 13. Received speech signals from the two/four wire conversion circuit 13 are sent through a received voice switching circuit 20 and a speaker amplifier 21 to a speaker 22, and transmitted speech signals from a microphone 23 are sent through a microphone amplifier 24 and a transmitted voice switching circuit 25 to the two/four wire conversion circuit 13. At the same time, the levels of the received speech signals and transmitted speech signals are detected with a received speech detector 26 and a transmitted speech detector 27, respectively, and then supplied to a comparator 28. The comparator 28 compares the received speech signal level, the transmitted speech signal level and a voltage level from a voltage setter 29, and according to the comparison results of the three levels, reciprocally changes losses of the received voice switching circuit 20 and the transmitted voice switching circuit 25. As a result, a loop gain of a closed loop formed by acoustic coupling between the speaker 22 and the microphone 23 is controlled to be less than 1, and howling (oscillation) can be prevented.

One of the problems in the prior-art key telephone system is that the losses of the received voice switching circuit 20 and the transmitted voice switching circuit 25 in the loudspeaking conversation mode must be set to be greater to prevent the howling because there are a plurality of closed loops which may generate howling. Assume that, for example, in FIG. 1, conversation is held between the key telephone $2_1$ in the loudspeaking mode and another separate key telephone $2_n$. When the separate telephone $2_n$ is in the handset conversation mode, there are two closed loops which may generate howling. One of the loops is formed by the following processes: the transmitted speech signal from the microphone $23_1$ is sent to the two/four wire conversion circuit $13_1$ and a part of the sent signal is mixed as a side tone with the received speech signal, and this side tone is sent to the speaker $22_1$, then a part of the side tone is supplied again to the microphone $23_1$ owing to acoustic coupling. The other loop is formed through the following processes: the transmitted speech signal from the microphone $23_1$ is sent to the two/four wire conversion circuit $6_n$ in the main apparatus and a part of the sent signal is mixed as a side tone with the transmitted speech signal from the telephone $2_n$, and this side tone is returned to the telephone $2_n$, and then a part of the side tone is fed from the speaker $22_1$ to the microphone $23_1$ again. When the accompanying telephone $2_n$ is also in the loudspeaking conversation mode, further another closed loop is added. The loop is formed through the following processes: the transmitted speech signal from the microphone $23_1$ is sent to the speaker $22_n$ and a part of the sent signals is supplied to the microphone $23_n$ owing to acoustic coupling; the signals supplied to the microphone $23_n$ are sent to the speaker $22_1$, then a part of the sent signals is supplied again to the microphone $23_1$.

Because there may be two or more such closed loops as described above, the losses of the voice switching circuits 20 and 25 must be set so large that each loop gain does not exceed 1. As a result, a high voice level is required for switching between the speech signal transmission state (where the loss of the received voice switching circuit 20 is large and the loss of the transmitted voice switching circuit 25 is small) and the speech signal reception state (where the loss of the received voice switching circuit 20 is small and the loss of the transmitted voice switching circuit 25 is large), thus causing the problem of difficulty in transmitting voices mutually.

SUMMARY OF THE INVENTION

An object of the invention is to enable loudspeaking conversation similar to natural conversation by reducing losses of the voice switching circuits.

The invention provides a key telephone system comprising a terminal device and a main apparatus which exchanges speech signals with the terminal device, the terminal device having a loudspeaking circuit for providing a predetermined amount of loss to one of first speech signals selected to be transmitted to the main apparatus and second speech signals received from the main apparatus to prevent howling in a loudspeaking conversation mode, said system comprising:

a first communication means provided in the terminal device, for sending the first speech signals to the main apparatus through a first channel and receiving the second speech signals from the main apparatus through a second channel separated from the first channel;

second communication means provided in the main apparatus and connected to the first communication means, for receiving the first speech signals from the first communication means through the first channel and sending the second speech signals to the first communication means through the second channel;

in the first and second communication means side tones between the first and second speech signals not being generated, whereby the predetermined amount of the loss caused by the loudspeaking circuit can be set to less than a loss which may be required for howling prevention if the side tones are generated.

Between the main apparatus and the terminal device, the first speech signals from the terminal device and the second speech signals from the main apparatus are transmitted through channels separated from each other, thereby eliminating the two/four wire conversion circuit as in prior-art system which generates a side tone, without the closed loop which may cause howling due to the side tone. Therefore, the losses for the speech signals to prevent howling in the loudspeaking conversation mode can be set relatively small. Setting relatively small losses means that switching between the speech signal transmission state and the speech signal reception state can be performed at relatively low speech signal levels. Consequently, more natural conversation, that is, loudspeaking conversation close to simultaneous two-way conversation is realized.

BRIEF DESCRIPTION OF THE DRAWINGS

FIG. 2 is a block diagram of a configuration showing a preferred embodiment of the key telephone system according to the invention.

DESCRIPTION OF PREFERRED EMBODIMENT

Figure 1:
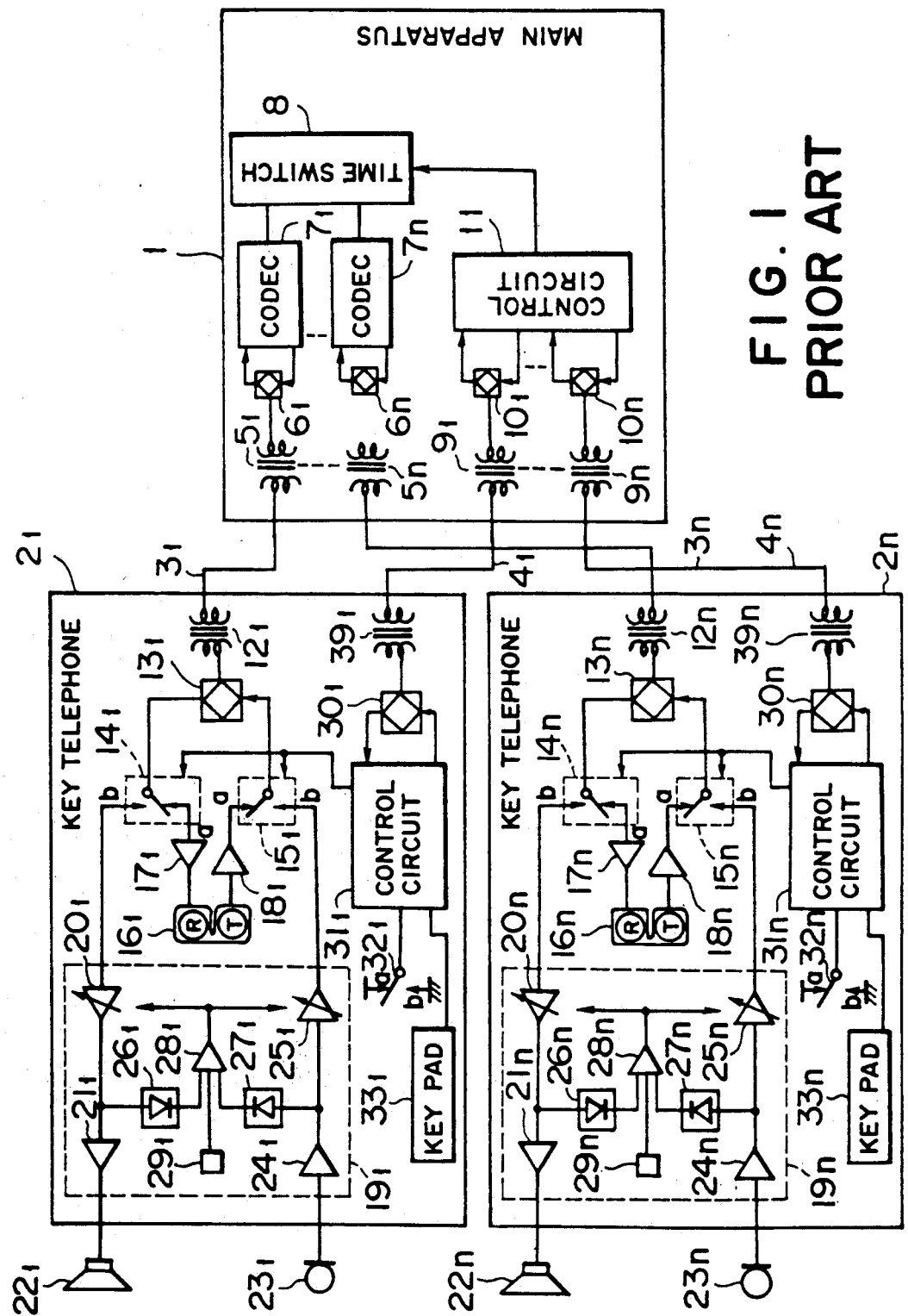
FIG. 1 is a block diagram of configuration of the prior art.

FIG. 2 shows a block diagram of configuration of a preferred embodiment according to the invention. In this figure, a block 41 is a main apparatus which is connected to a plurality of key telephones $42_1$-$42_n$ through two-wire digital transmission lines $43_1$-$43_n$.

In the main apparatus, the transmission lines $43_1$-$43_n$ are connected through digital signal transformers $44_1$-$44_n$ to digital communication circuit $45_1$-$45_n$, respectively. The digital communication circuit $45_1$-$45_n$ are connected to a time switch 46 which performs speech path switching and a control circuit 47 which controls the speech path switching, and exchange digital speech signals with the time switch 46 and digital control signals with the control circuit 47.

In a key telephone $42_1$, by way of example, the transmission line $43_1$ is connected through a digital signal transformer $48_1$ to a digital communication circuit $49_1$. The digital communication circuit $49_1$ sends to and receives from the digital communication circuit $45_1$ in the main apparatus, using a kind of half-duplex communication system called "Ping-Pong transmission", with the digital speech signals and the digital control signals being incorporated into bursts in the form of B+D (B is a speech signal channel and D a control signal channel). In other words, between the key telephone $42_1$ and the main apparatus 41, the transmitted speech signal (the speech signal transmitted from the key telephone $42_1$ to the main apparatus 41) and the received speech signal (the signal transmitted from the main apparatus 41 to the key telephone $42_1$) are transmitted over time-separated channels. The digital communication circuit $49_1$ is connected to a CODEC $50_1$ and a control circuit $51_1$, and exchanges digital speech signals with the CODEC $50_1$ and the digital control signals with the control circuit $51_1$.

The CODEC $50_1$ is connected to mode selector switches $52_1$ and $53_1$, receives the digital speech signals from the digital communication circuit $49_1$, converts the digital signals to analog speech signals and sends the analog signals to the mode selector switch $52_1$, and receives analog speech signals from the mode selector switch $53_1$, converts the analog signals to digital speech signals and sends the digital signals to the digital communication circuit $49_1$.

The control circuit $51_1$ performs not only switching of the mode selector switches $52_1$ and $53_1$ in response to the control signals from the digital communication circuit $49_1$, hook signals from a hook switch $54_1$, pressed-key information from a key pad $55_1$, etc., but also performs various control operations, including control of output signal levels of a comparator $68_1$, which is described later.

The mode selector switches $52_1$ and $53_1$ selects the handset conversation mode and the loudspeaking conversation mode. FIG. 2 shows the handset conversation mode. In the handset conversation mode, a handset $56_1$ is connected through a received speech signal amplifier $57_1$ and a transmitted speech signal amplifier $58_1$ to the CODEC $50_1$. On the other hand, in the loudspeaking conversation mode, in which the selector switches $52_1$ and $53_1$ are positioned reversely to the figure, a loudspeaking conversation circuit $59_1$ is connected to the CODEC $50_1$. In this mode, received speech signals from the CODEC $50_1$ are fed through a received voice switching circuit $60_1$ and a speaker amplifier $61_1$ to a speaker, and transmitted speech signals from a microphone $63_1$ are fed through a microphone amplifier $64_1$ and a transmitted voice switching circuit $65_1$ to the CODEC $50_1$. At the same time, voice levels of the received speech signals and the transmitted speech signals are detected by a received speech signal detector $66_1$ and a transmitted speech signal detector $67_1$, respectively, and fed to the comparator $68_1$. The comparator $68_1$ compares the received speech signal level, the transmitted speech signal level and a voltage level out of a voltage setting circuit 69, and according to the comparison results of the three levels, supplies signals of logical value 1 or 0. The output signals reciprocally control losses of the received voice switching circuit $60_1$ and transmitted voice switching circuit $65_1$. In other words, when the logical value of the output signal described above is 1, for example, a speech signal reception state is set so that the loss of the received voice switching circuit $60_1$ is small and that the loss of the transmitted voice switching circuit $65_1$ is large, and on the contrary, when the above logical value is 0, a speech signal transmission state is set so that the loss of the received voice switching circuit $60_1$ is large and that the loss of the transmitted voice switching circuit $65_1$ is small. Actual losses in the speech signal reception state and the speech signal transmission state depend on the actual levels of output signals corresponding to the logical values 0 and 1 from the comparator. The actual signal levels of the logical values 0 and 1 are controlled by the control circuit $51_1$.

The control of the losses will be described in detail below. Assume that conversation is held between the key telephone $42_1$ in the loudspeaking conversation mode and another separate telephone $42_n$. When the separate key telephone $42_n$ is in the handset conversation mode, a hook signal specifying the handset conversation mode is fed from a hook switch $54_n$ to a control circuit $51_n$, which then sends out a digital control signal specifying the handset conversation mode to the digital communication circuit $49_n$. The digital control signal is fed from the digital communication circuit $49_n$ through the digital communication circuit $45_n$, the control circuit 47 and the digital communication circuit $45_1$ in the main apparatus to the digital communication circuit $49_1$ in the key telephone $42_1$, and then received by the control circuit $51_1$. When the control circuit $51_1$ receives the control signal specifying the handset conversation mode of the other telephone, the control circuit $51_1$ controls levels of output signals of the comparator $68_1$ so that the loss of the received voice switching circuit $60_1$ in the speech signal transmission state and the loss of the transmitted voice switching circuit $65_1$ in the speech signal reception state become predetermined first values.

On the other hand, when the other key telephone $42_n$ is also in the loudspeaking conversation mode, the digital control signal specifying the loudspeaking conversation mode is fed from the control circuit $51_n$ in the key telephone $42_n$ through the same path described above to the control circuit $51_1$ in the key telephone $42_1$. When the control circuit $51_1$ receives the control signal specifying the loudspeaking conversation mode, the control circuit $51_1$ controls levels of output signals of the comparator $68_1$ so that the loss of the received-voice switching circuit $60_1$ in the speech signal transmission state and the loss of the transmitted-voice switching circuit $65_1$ in the speech signal reception state become the predetermined second values.

The first and second values of the losses are such values that, in each case where the other key telephone $42_n$ with which the loudspeaking is held is in the handset or loudspeaking conversation mode, loop gains of all closed loops which may generate howling are set to less than 1. This embodiment uses, as a communication between the main apparatus 41 and the key telephones 42, half-duplex communication in which the transmitted speech signal channel and the received speech signal channel are clearly separated, eliminates the two/four wire conversion circuits, which have been required in the prior-art system, and has no closed loop attributed to side tones by the two/four wire conversion circuits. Consequently, when the other telephone $42_n$ is in the handset conversation mode, there is merely a closed loop attributed to the acoustic coupling between the speaker $62_1$ and microphone $63_1$ or of the handset $56_n$. This loop enables the loop gain to be less than 1 with very small losses because the acoustic coupling of the handset $56_n$ is very modest. Also, when the other telephone $42_n$ is in the loudspeaking conversation mode, there is a closed loop attributed to the acoustic coupling between the speaker $62_1$ and the microphone $63_1$ and between the speaker $62_n$ and the microphone $63_n$. However, there are additional two closed loops attributed to the side tones in the two/four wire conversion circuits like the prior-art system. Therefore, the first value of the loss can be set to much smaller than that in the prior-art system, and the second value of the loss can be set greater than the first value but considerably smaller than that in the prior-art system.

Figure 3:
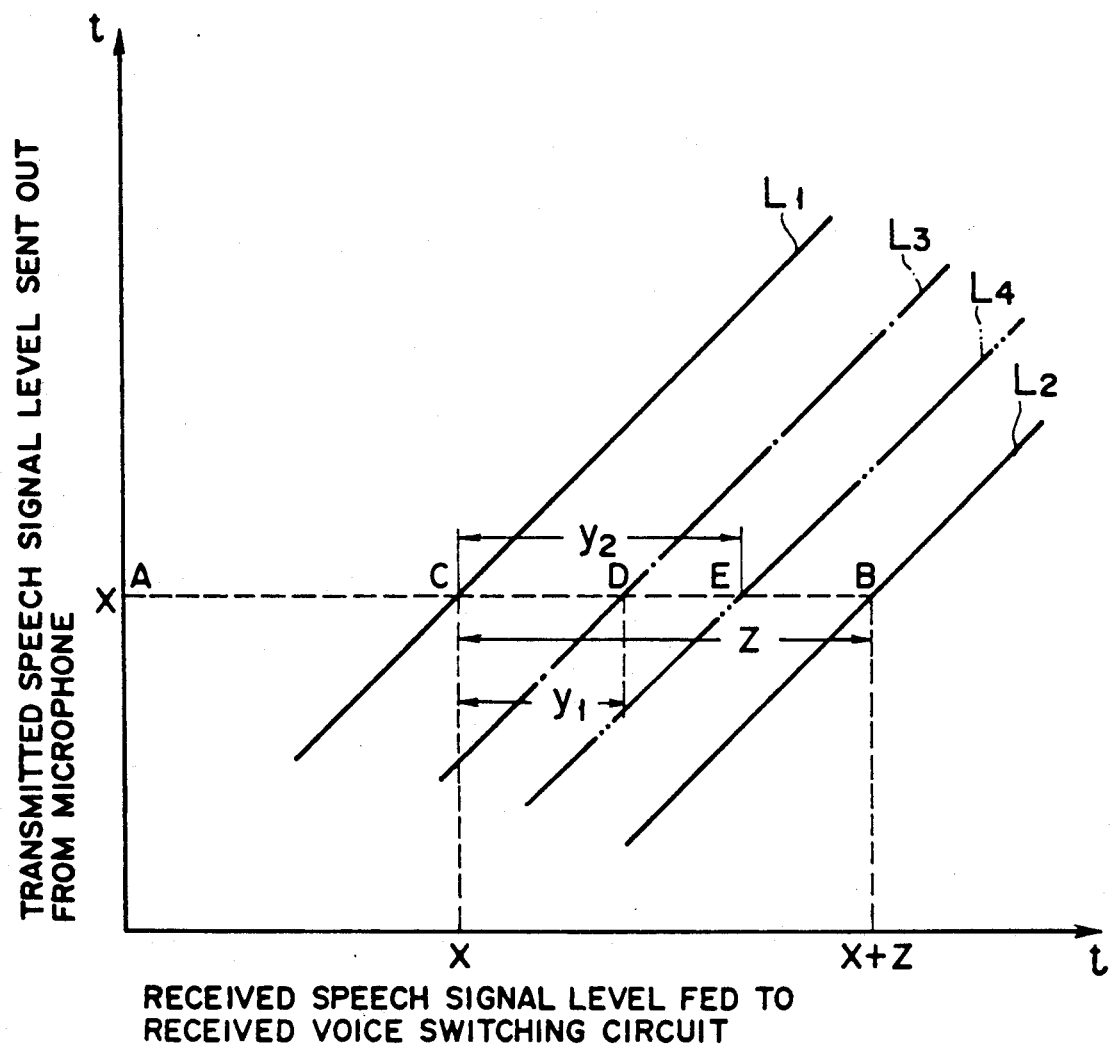
FIG. 3 shows comparison of switching characteristics of the speech signal transmission state and the speech signal reception state of the embodiment shown in FIG. 2 and the example of prior art in FIG. 1.

Thus, when the losses of the received-voice switching circuit $60_1$ and the transmitted-voice switching circuit $65_1$ are set to relatively small values, the voice levels required for switching of the speech signal reception state and the speech signal transmission state are lowered, and conversation similar to simultaneous two-way conversation is realized. This will be described in details with reference to FIG. 3. FIG. 3 shows switching characteristics of the speech signal reception state and the speech signal transmission state of the embodiment in FIG. 2 in comparison with those of the prior-art system in FIG. 1. The horizontal axis represents levels of the received speech signals fed to the received-voice switching circuits and the vertical axis levels of the transmitted speech signals fed from the microphones.

Lines $L_1$ and $L_2$ are, respectively, a switching threshold line from the speech signal reception state to the speech signal transmission state and a switching threshold line from the speech signal transmission state to the speech signal reception state in the prior-art system. In the prior-art system, if the transmitted speech signal level is X and the received speech signal level is 0 (point A), then the speech signal transmission state is set. That is, the loss of the received-voice switching circuit is relatively large (for example, Z) and the loss of the transmitted-voice switching circuit is relatively small (for example O). In this state, when the received speech signal level increases and reaches a level X+Z (point B), which equals to the loss Z of the received-voice switching circuit plus the transmitted speech signal level X, the speech signal transmission state turns into the speech signal reception state, and the loss of the received-voice switching circuit becomes relatively small (for example, O) and the loss of the transmitted-voice switching circuit becomes relatively large (for example, Z). After that, when the received speech signal level decreases and equals to the level X (point C), the speech signal reception state returns to the speech signal transmission state again. In this way, the switching from the speech signal transmission state to the speech signal reception state does not occur unless the received speech signal level is considerably larger than the transmitted speech signal level, that is, unless the other conversation party speaks very loudly. In contrast, in the embodiment, the threshold line of switching from the speech signal transmission state to the speech signal reception state is $L_3$ when the loss is set to a first value (for example, $y_1$) which is considerably smaller than that of the prior-art system, and the line is $L_4$ when the loss is set to a second value (for example, $y_2$). Consequently, assuming the initial condition described above (point A), the switching from the speech signal transmission state to the speech signal reception state is performed when the received speech signal level increases and reaches a level (point D or E) which equals the relatively small loss $y_1$ or $y_2$ plus the transmitted speech signal level X.

In other words, the switching from the speech signal transmission state to the speech signal reception state is performed with the received speech signal level which is the decrease of loss $Z-y_1$ or $Z-y_2$ lower than that of the prior-art system.

The operation described above is a case where the characteristics of the comparator are specified so that the speech signal transmission state is set in silent state in absence of the received speech signals and the transmitted speech signals. When, on the contrary, the speech signal reception state is set in the silent state, the low transmitted speech signal level which is reduced by a decrease of the loss turns the speech signal reception state into the speech signal transmission state. Consequently, the switching between the speech signal transmission state and the speech signal reception state is smoothly performed in loudspeaking conversation without particularly loud voices, and conversation similar to simultaneous two-way conversation is enabled.

The invention is not limited to the embodiment described above. For example, the communication system between the main apparatus and the key telephones can use another separate communication systems such as full duplex communications (channels are separated spatially) so long as channels of the received speech signals and the transmitted speech signals are separated. However, the embodiment using half duplex communications is more practical because half duplex communication can use two-wire transmission lines, and that communications between the main apparatus and the key telephones do not require such a high transmission rate that full duplex communication may provide. Though speech signals and control signals can also be transmitted through separate lines, such a system as described in the embodiment in which the speech signals and the control signals are incorporated into a single burst and transmitted has the advantage of a single transmission line in communications between a main apparatus and key telephones, in which such a high transmission rate is not required.

What is claimed is:

1. A key telephone system comprising a terminal device and a main apparatus which exchanges speech signals with the terminal device, the terminal device having a loudspeaking circuit for providing a predetermined amount of loss to either one of first speech signals selected to be transmitted to the main apparatus and second speech signals received from the main apparatus to prevent howling in a loudspeaking conversation mode, said system comprising:

a first communication means provided in the terminal device, for sending the first speech signals to the main apparatus through a first channel and receiving the second speech signals from the main apparatus through a second channel separated from the first channel;

second communication means provided in the main apparatus and connected to the first communication means, for receiving the first speech signals from the first communication means through the first channel and sending the second speech signals to the first communication means through the second channel;

in the first and second communication means side tones between the first and second speech signals not being generated, whereby the predetermined amount of the loss caused by the loudspeaking circuit can be set less than a loss which may be required for howling prevention if the side tones are generated.

2. The system as claimed in claim 1 including first and second terminal devices, in which the main apparatus comprises first control means for sending out a control signal which indicates whether the second terminal device is in the loudspeaking conversation mode or a handset conversation mode when said first terminal device is in the loudspeaking conversation mode and conversation is held between the first terminal device and a second terminal device, and the first terminal device comprises a second control means responsible to the control signal for controlling the loudspeaking circuit of the first terminal device to change the amount of the loss caused by the loudspeaking circuit depending on the loudspeaking conversation mode or the handset conversation mode of the second terminal device.

3. The system as claimed in claim 1, in which the first and second channels are time-division channels separated from each other.

4. The system as claimed in claim 1, in which the first and second channels are space-division channels separated from each other.

* * * * *